(12) United States Patent
Heeren

(10) Patent No.: US 11,377,192 B2
(45) Date of Patent: Jul. 5, 2022

(54) DOOR ARRANGEMENT FOR AN AIRCRAFT, AND AIRCRAFT

(71) Applicant: Airbus Operations GmbH, Hamburg (DE)

(72) Inventor: Jens Heeren, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 357 days.

(21) Appl. No.: 16/550,878

(22) Filed: Aug. 26, 2019

(65) Prior Publication Data

US 2020/0070947 A1 Mar. 5, 2020

(30) Foreign Application Priority Data

Aug. 30, 2018 (DE) .......................... 102018121240.2

(51) Int. Cl.
*B64C 1/14* (2006.01)
*E05D 15/32* (2006.01)

(52) U.S. Cl.
CPC .......... *B64C 1/1461* (2013.01); *B64C 1/1423* (2013.01); *E05D 15/32* (2013.01); *E05Y 2900/502* (2013.01)

(58) Field of Classification Search
CPC ..... B64C 1/1461; B64C 1/1407; B64C 1/143; B64C 1/1438; B64C 1/1423; E05D 15/32; E05Y 2900/502
See application file for complete search history.

(56) References Cited

U.S. PATENT DOCUMENTS

| 4,199,120 A | 4/1980 | Bergman et al. |
| 4,837,894 A | 6/1989 | Lin |
| 6,308,376 B1 | 10/2001 | Koshikawa |

(Continued)

FOREIGN PATENT DOCUMENTS

| DE | 19702085 C2 | 7/1998 |
| DE | 60218365 T2 | 12/2007 |

(Continued)

OTHER PUBLICATIONS

German Search Report; priority document.
French Search Report for corresponding French patent application No. 1909325 dated Mar. 31, 2022.

*Primary Examiner* — Joshua J Michener
*Assistant Examiner* — Cindi M Curry
(74) *Attorney, Agent, or Firm* — Greer, Burns & Crain, Ltd.

(57) ABSTRACT

An aircraft door arrangement, comprising a door pivotable between closed and open positions, a frame section in a door opening region, and an articulation arrangement connecting the door and frame section. First and second arms are mounted on the frame section, rotatable about first and second axes, respectively. Third and fourth arms are mounted on the door, rotatable about third and fourth axes, respectively. The second arm, at a first position, is rotatably coupled to the fourth arm about a fifth axis, and at a second position, closer to the second axis, is rotatably coupled to the third arm about a sixth axis. The third arm, at a third position, is rotatably coupled to the first arm about a seventh axis, and at a fourth position, closer to the third axis, is rotatably coupled to the second arm about the sixth axis. All axes are oriented substantially parallel.

11 Claims, 8 Drawing Sheets

(56) References Cited

U.S. PATENT DOCUMENTS

| | | | |
|---|---|---|---|
| 6,834,834 B2 | 12/2004 | Dazet et al. | |
| 7,197,790 B1 | 4/2007 | Edmondson | |
| 10,214,950 B2 * | 2/2019 | Frank | E05D 7/06 |
| 2005/0178601 A1 * | 8/2005 | Galvani | B64C 1/1407 |
| | | | 180/271 |
| 2005/0188505 A1 | 9/2005 | Bennett | |
| 2006/0202087 A1 * | 9/2006 | Mortland | B64C 1/1407 |
| | | | 244/129.5 |
| 2006/0230919 A1 * | 10/2006 | Holder | B64C 1/1407 |
| | | | 91/436 |
| 2008/0035793 A1 * | 2/2008 | Obst | B64C 1/1407 |
| | | | 244/129.5 |
| 2010/0012411 A1 | 1/2010 | Fiacchino et al. | |
| 2013/0227819 A1 * | 9/2013 | Frank | E05D 3/16 |
| | | | 16/369 |
| 2016/0083071 A1 * | 3/2016 | Pichlmaier | B64C 1/1407 |
| | | | 92/76 |
| 2019/0002077 A1 * | 1/2019 | Kijak | E05D 15/48 |
| 2020/0300013 A1 * | 9/2020 | Chadwell | E05D 11/1057 |

FOREIGN PATENT DOCUMENTS

| | | |
|---|---|---|
| DE | 102008030696 A1 | 1/2010 |
| GB | 2042060 A | 9/1980 |

* cited by examiner

DOOR ARRANGEMENT FOR AN AIRCRAFT, AND AIRCRAFT

CROSS-REFERENCES TO RELATED APPLICATIONS

This application claims the benefit of the German patent application No. 102018121240.2 filed on Aug. 30, 2018, the entire disclosures of which are incorporated herein by way of reference.

FIELD OF THE INVENTION

The present invention relates to a door arrangement for an aircraft, and to an aircraft with the door arrangement.

BACKGROUND OF THE INVENTION

Doors of modern aircraft, for example aircraft cabin doors, are generally attached to the door frame via a large articulated arm and further joints. The articulated arm has a substantially L-shaped cross section, as viewed in a plane perpendicular to the door leaf, and, at each of its ends, is fastened to the door frame and to the door leaf so as to be rotatable about an approximately vertically running axis. In the closed state of the cabin door, the articulated arm projects into the interior of the aircraft. In order to open the door, the latter is first of all raised by means of an opening lever for unlocking purposes. The unlocked door is then pivoted open outwards by the articulated arm and further joints, with its central main plane being guided parallel to the outer surface of the aircraft. In the open end position of the door, the latter is therefore oriented parallel to the door opening and is arranged outside the aircraft in relation to the door opening in a manner offset in the longitudinal and transverse directions of the aircraft.

SUMMARY OF THE INVENTION

Against this background, it is an object of the present invention to provide a lighter door arrangement which requires less construction space and nevertheless can be produced relatively simply. Furthermore, it is an object of the invention to provide an aircraft with such a door arrangement.

The door arrangement is provided for an aircraft and comprises a door leaf, which is pivotable between a closed position, in which it closes a door opening of the aircraft, and an open position, in which it opens up the door opening, a frame section arranged in the region of the door opening, and an articulation arrangement which connects the door leaf to the frame section. The articulation arrangement has a plurality of articulated arms, of which a first is mounted on the frame section so as to be rotatable about a first axis and a second is mounted on the frame section so as to be rotatable about a second axis. The term "between" should be understood here as including the end points of the region.

Furthermore, a third of the articulated arms is mounted on the door leaf so as to be rotatable about a third axis and a fourth of the articulation arms is mounted on the door leaf so as to be rotatable about a fourth axis. In addition, at a first position along the second articulated arm, the second articulated arm is coupled to the fourth articulated arm so as to be rotatable about a fifth axis and, at a second position along the second articulated arm, is coupled to the third articulated arm so as to be rotatable about a sixth axis. The first position is further away from the second axis than the second position. By contrast, at a third position along the third articulated arm, the third articulated arm is coupled to the first articulated arm so as to be rotatable about a seventh axis and, at a fourth position along the third articulated arm, is coupled to the second articulated arm so as to be rotatable about the sixth axis. In this case, the third position is further away from the third axis than the fourth position. The sixth axis therefore preferably runs through a location at which the second articulated arm and the third articulated arm intersect, in particular overlap in an intersecting manner. The distance between the second axis and the sixth axis and/or the distance between the third axis and the sixth axis is preferably independent of the position of the door leaf That is to say, the distances preferably remain unchanged when the door leaf is pivoted from its closed position into its open position.

All of the abovementioned axes, i.e., the first to seventh axes, are oriented substantially parallel to one another. In this case, substantially parallel to one another means that, owing to manufacturing tolerances and bearing play, the axes can be oriented at small angles with respect to one another as long as the door leaf is thereby not considerably obstructed from moving between the closed position and the open position. The first to seventh axes can be oriented substantially vertically when the aircraft is in its horizontal position.

In the case of a door arrangement with these features, the articulation arrangement can be constructed comparatively compactly, and therefore it takes up little construction space in the aircraft. Unlike in the case of door arrangements with an L-shaped articulated arm, the articulation arrangement according to the present invention can be completely arranged in an edge region of the door leaf (at the edge of the door opening). If the door is completely open, the articulation arrangement according to the invention takes up little space in the door opening. In an advantageous manner, the door opening and the door leaf can also be configured to be larger than in the case of conventional door arrangements. This makes it easier for passengers to enter the aircraft and reduces the entry time. Furthermore, it is possible to dimension the articulation arrangement to be of such a small size that it fits under the door lining, and therefore it takes up substantially less space in the interior of the aircraft. The smaller size of the door makes it possible for an airline to arrange more seats in the interior of the cabin. In comparison to door arrangements, the door leaf of which is fastened to the frame section via a hinge protruding outwards beyond the door leaf, an aircraft with a door arrangement according to the present invention is distinguished by improved aerodynamics.

When the door leaf is in its open position, it protrudes at least in sections outwards over an outer surface of the aircraft in the vicinity of the door opening. In other words, the door opens outwards. The door leaf can be pivoted from its closed position, in which it preferably completely closes the door opening, outwards about an opening angle into the vicinity of the aircraft. The door leaf here is preferably pivoted about an axis of rotation which is fixed in position relative to the door section. The maximum opening angle can be at least 45 degrees or at least 60 degrees or at least 75 degrees or at least 90 degrees or at least 120 degrees or at least 145 degrees or at least 170 degrees or at least 180 degrees. The opening angle is preferably between 160 and 200 degrees, most preferably between 170 and 190 degrees. It can be in particular 180 degrees. From an opening angle of approximately 90 degrees, the door leaf preferably protrudes completely over the outer surface of the aircraft. If the opening angle is greater than 90 degrees, the door leaf overlaps a part of the outer surface of the aircraft adjacent to the door opening, when looking head-on at the door opening from the outside. At an opening angle of 180 degrees, the door leaf has been pivoted out of the door opening to such an extent that it does not overlap the door opening, when looking head-on at the door opening from the outside.

The first and/or the second axis are/is preferably arranged in a positionally fixed manner relative to the frame section. In other words, the position of the first and/or second axis preferably remains the same in the reference system of the frame irrespective of the position in which the door leaf is in. The frame section can be a door frame which surrounds the door opening, at least in sections. The frame section/door frame can be formed integrally with an outer wall of the aircraft defining the outer surface. In particular, the door frame and the outer wall can be produced from the same material. It is also conceivable for the frame section to be part of a rib of the aircraft. In this case, the first and/or the second articulated arm can each be mounted rotatably in relation to the frame section on a carrier element extending from the rib in the direction of the door leaf.

A first point at which the first articulated arm is mounted on the frame section is preferably spaced apart further from the outer surface of the aircraft than a second point at which the second articulated arm is mounted on the frame section and/or the second axis. Furthermore, the first axis can be spaced apart further from the outer surface of the aircraft than the second axis. In addition, the first axis can be positioned closer to the center of the door opening than the second axis. In particular, the first point can be arranged closer to the edge of the door opening than the second point.

The third and/or the fourth axis can be arranged analogously in a positionally fixed manner relative to the door leaf. In this case, the position of the third and/or fourth axis is identical in the reference system of the door leaf, in particular irrespective of the position in which the door is in. At an inner side facing the interior of the aircraft, the door leaf can have a door lining which is positionally fixed in the system of coordinates of the door leaf. In this case, the articulation arrangement is preferably covered by the door lining A fourth point at which the fourth articulated arm is mounted on the door leaf can be arranged further away from the edge of the door opening than a third point at which the third articulated arm is mounted on the door leaf when the door leaf is in its closed position. Furthermore, the fourth point can be arranged closer to an outer surface of the door leaf which faces away from the interior of the aircraft than the third point when the door leaf is in its closed position.

The first articulated arm and/or the fourth articulated aim can be designed to be straight. In particular, in each case one or both of the articulated arms can be designed as straight struts. The central planes of the straight struts can be oriented substantially perpendicularly to the first and fourth axes. By contrast, the second and/or the third articulated arm are preferably curved. If the door leaf is in its closed and/or open position, in particular, the second articulated aim can be curved away from the fourth articulated arm starting from the first position in the direction of the second position. In one or both of these cases, the third articulated arm can be curved away from the first articulated arm starting from the third position in the direction of the fourth position. The first articulated arm is advantageously designed as per the fourth articulated arm. Additionally or alternatively thereto, the second articulated arm can be designed as per the third articulated arm. In these cases, the articulated arms can be produced cost-effectively in large piece numbers. The curved design makes it possible to configure the articulation arrangement compactly and nevertheless to avoid collisions with the frame element.

Furthermore, with respect to a plane of symmetry containing the sixth axis, the first axis can be arranged symmetrically with respect to the fourth axis and the second axis can be arranged symmetrically with respect to the third axis when the door leaf is in its closed position. Here, the plane of symmetry consequently extends between the second and third axes. When looking along one of the first to seventh axes, the first articulated arm, which is mirrored on the plane of symmetry, is congruent to the fourth articulated arm, and the second articulated arm, which is mirrored on the plane of symmetry, is congruent to the third articulated arm, in particular, when the door leaf is in its closed position.

The sixth axis is preferably arranged on a first side of a plane containing the first and the second axis when the door leaf is in its closed position. If, by contrast, the door is completely open, the opening angle of the door therefore being approximately 180 degrees, the sixth axis is preferably positioned on a second side of the plane opposite the first side. The first side can be the side of the aforementioned plane that faces the center of the door opening. The door arrangement is therefore configured in such a manner that the sixth axis crosses the plane containing the first and second axes during opening. Starting from the closed position of the door leaf, a distance between the sixth axis and the first axis increases during the opening of the door preferably until the sixth axis lies in the plane containing the first and second axes. If the door is opened further, the distance is reduced as the opening angle increases, wherein the distance between the first and the sixth axis preferably decreases as the distance of the sixth axis from the plane containing the first and second axes increases.

In order to use this fact for more comfortable operation of the door, the door arrangement can have a spring element which can be configured to act upon the door leaf with a force in the direction of its closed position if the sixth axis is located on the first side of the plane containing the first and the second axis. Additionally or alternatively, the spring element can be configured to act upon the door leaf with a force in the direction of its completely open position if the sixth axis is located on the second side of the plane containing the first and the second axis. For this purpose, the spring element advantageously connects the second articulated arm at the second position and/or the third articulated arm at the fourth position to a point on the first articulated arm between the first axis and the seventh axis. Most preferably, the spring element connects the second articulated arm at the second position and/or the third articulated arm at the fourth position to the first axis. The spring element can thus be pretensioned when the sixth axis moves in the direction of the plane containing the first and second axes. If the sixth axis lies in the plane, the door leaf is located in the dead center from which the door leaf is not moved out by the spring force. When the sixth axis lies on the first side of the plane, the spring force of the spring element preferably counteracts the opening of the door. At a sufficiently large spring force, the spring element can then hold the door leaf in its closed position. If, by contrast, the sixth axis lies on the second side of the plane, the spring force acts preferably in a manner assisting the opening of the door. The spring element is then advantageously configured to hold the door in its open, in particular completely open, position. If the door leaf in its closed position, the spring element can be pretensioned or relaxed. The spring element can likewise be pretensioned or relaxed when the door leaf is in its open position at an opening angle of approx. 180 degrees.

In a development, the spring element is designed as a spring-damper element which permits damped opening and closing of the door. The spring-damper element can have one or more of the features of the spring element described above. The damping makes it possible to effectively prevent the door due to the spring force striking against the frame section or the outer surface of the aircraft during the opening or closing, as a result of which the door could otherwise be damaged. The spring element or the spring-damper element can comprise, for example, a steel spring, a gas-filled compression spring and/or a damping member which preferably counteracts the movement of the sixth axis.

An aircraft proposed here comprises a door arrangement which is described above in detail. The door opening is preferably formed in an outer wall of the aircraft. In particular, it can be provided that the door opening is arranged between two mutually adjacent ribs and/or stringers of the aircraft. The frame section can be formed integrally here with the outer wall, a rib and/or a stringer.

BRIEF DESCRIPTION OF THE DRAWINGS

Preferred embodiments of a door arrangement for an aircraft and of an aircraft will now be explained more precisely with reference to the attached schematic drawings, wherein.

DETAILED DESCRIPTION OF THE PREFERRED EMBODIMENTS

Figure 1A:
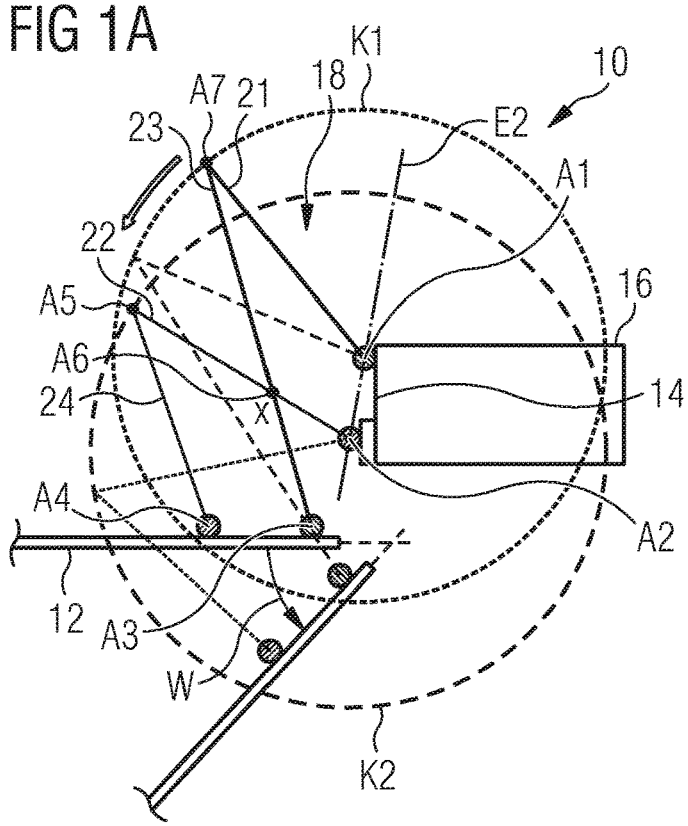
FIG. 1A shows a first embodiment of a door arrangement in a schematic view, wherein the door leaf is illustrated in its closed position and in a first open position at an opening angle of approx. 45°.
Figure 1B:
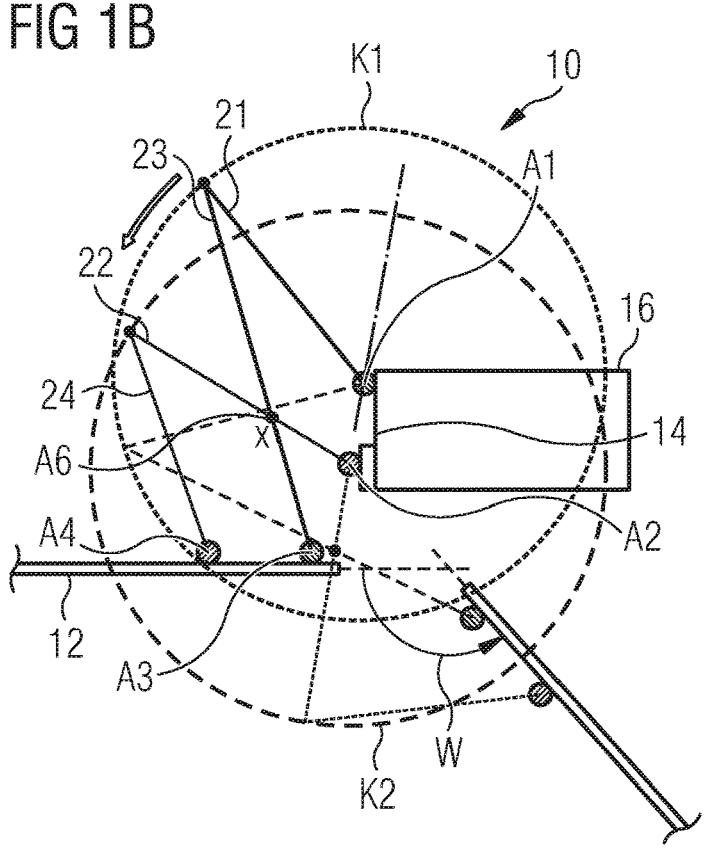
FIG. 1B shows the door arrangement from FIG. 1A in a schematic view, wherein the door leaf is illustrated in its closed position and in a second open position at an opening angle of approx. 135°.
Figure 1C:
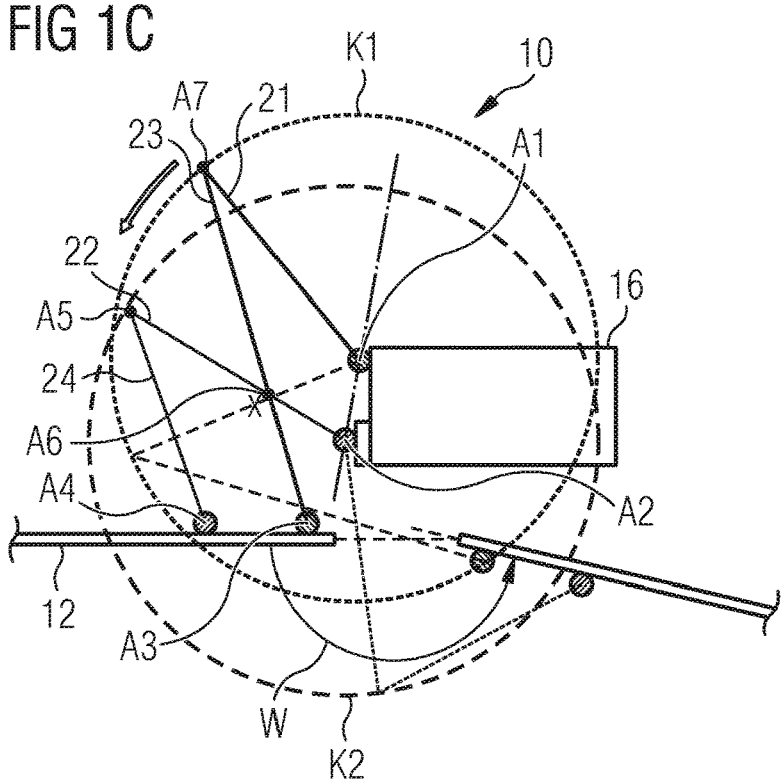
FIG. 1C shows the door arrangement from FIG. 1A in a schematic horizontal view, wherein the door leaf is illustrated in its closed position and in a third open position at an opening angle of approx. 180°.

FIGS. 1A-1C show a first embodiment of a door arrangement 10 for an aircraft 100 in a schematic top view which is not true to scale. The door arrangement 10 comprises a door leaf 12 (only shown in sections in the figures), a frame section 16 arranged in the region of a door opening 14, and an articulation arrangement 18 which connects the door leaf 12 to the frame section 16 and has a plurality of articulated arms 21-24. In this embodiment, in particular, a first articulated arm 21, a second articulated arm 22, a third articulated arm 23 and a fourth articulated arm 24 are provided. The door leaf 12 is pivotable between a closed position, which is illustrated by solid lines in FIGS. 1A-1C and in which it closes the door opening 14 of the aircraft 100, and an open position, which is illustrated by interrupted lines and in which it opens up the door opening 14.

As clarified, for example, in FIG. 1A, the first articulated arm 21 is mounted on the frame section 16 so as to be rotatable about a first axis A1, the second articulated arm 22 is mounted on the frame section 16 so as to be rotatable about a second axis A2, the third articulated arm 23 is mounted on the door leaf 12 so as to be rotatable about a third axis A3 and the fourth articulated arm 24 is mounted on the door leaf 12 so as to be rotatable about a fourth axis A4. The first and second axes A1, A2 are positionally fixed with respect to the frame section 16, and the third and fourth axes A3, A4 are positionally fixed with respect to the door leaf 12. The respective articulated arm 21-24 can therefore rotate at its connecting point to the frame section 16 or to the door leaf 12 relative to the frame section 16 or to the door leaf 12, but cannot shift in a translatory manner relative to the frame section 16 or door leaf 12.

The second articulated arm 22 intersects the third articulated arm 23 at an intersection point X at which the second and the third articulated arms 22 are coupled to each other so as to be rotatable about a common sixth axis A6. In particular, it is provided that, at a first position along the second articulated arm 22, the second articulated arm 22 is coupled to the fourth articulated arm 24 so as to be rotatable about a fifth axis A5 and, at a second position (at the intersection point X) along the second articulated arm 22, is coupled to the third articulated arm 23 so as to be rotatable about the sixth axis A6. The sixth axis A6 can therefore run through the intersection point X. The first position is further away from the second axis A2 than the second position. In other words, the intersection point X lies between the second axis A2 and the fifth axis A5. The first to seventh axes A1-A7 are oriented substantially parallel to one another.

Figure 3A:
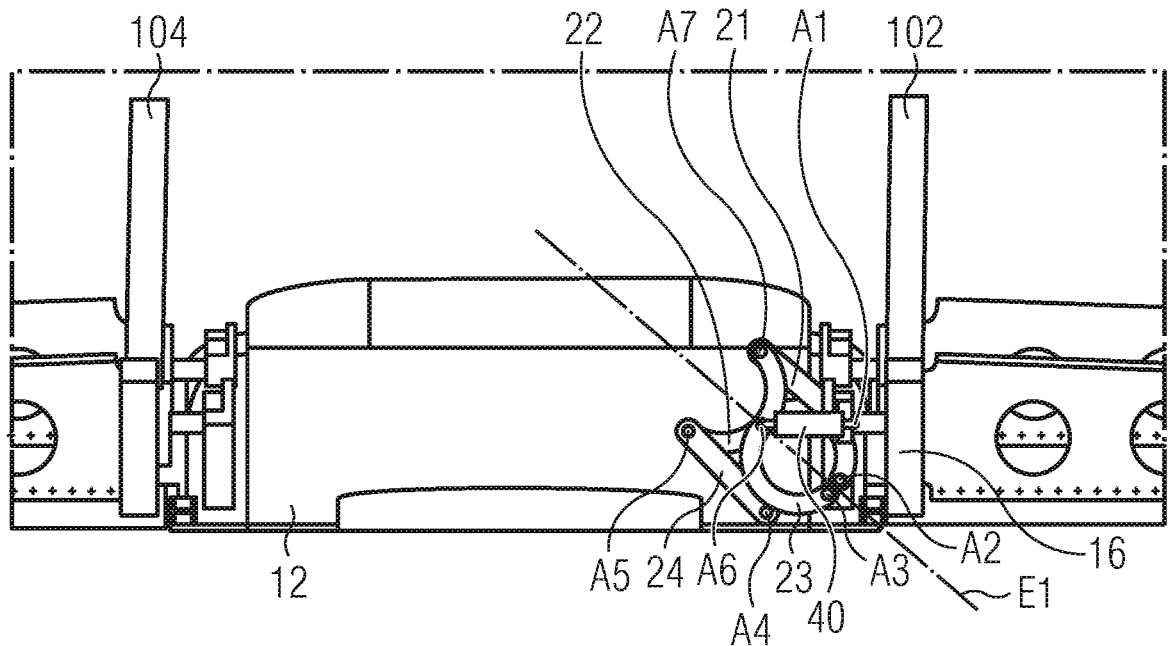
FIGS. 3A-3G show a door opening sequence of the door arrangement from FIG. 2A in a top view looking along one of the first to seventh axes.
Figure 3B:
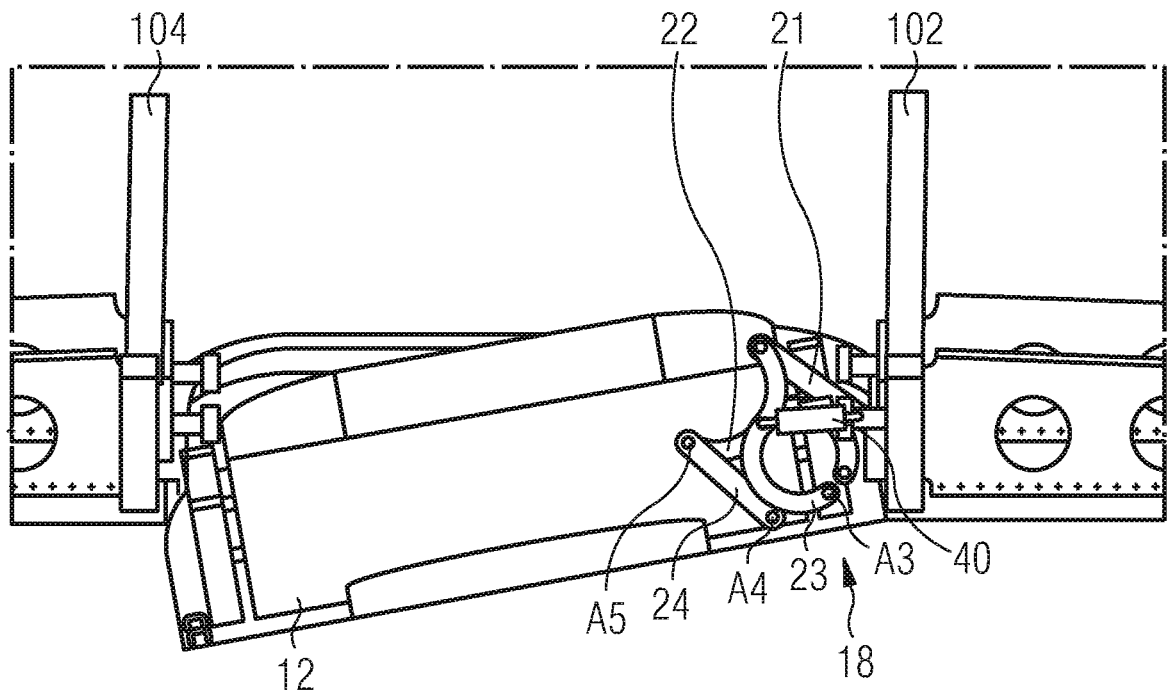
Figure 3C:
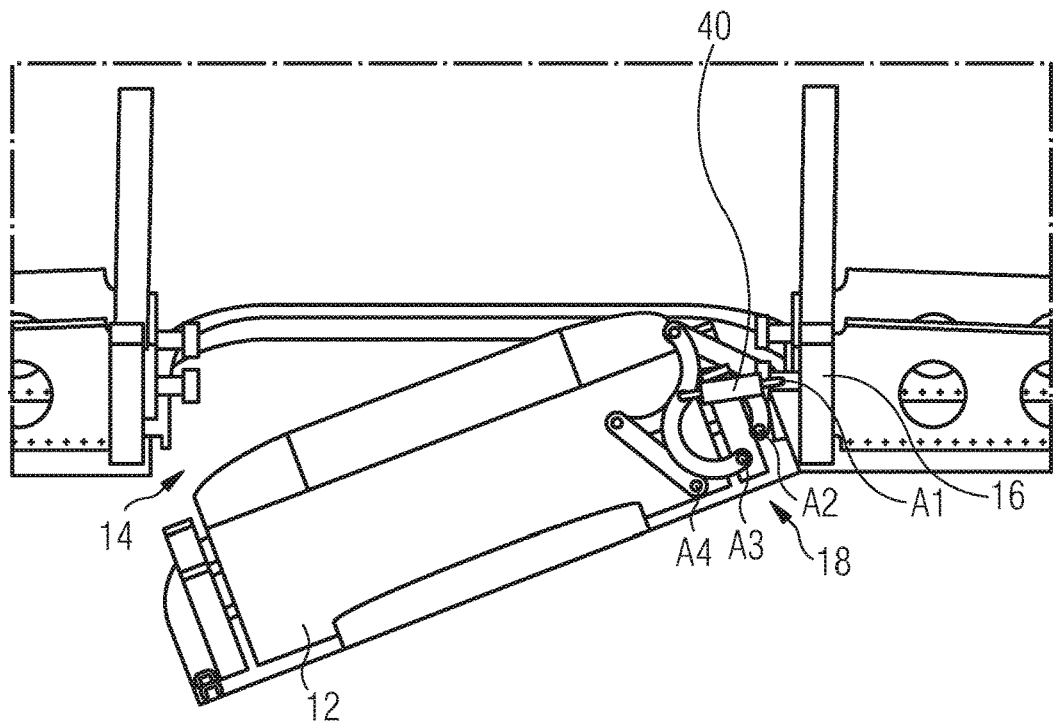
Figure 3D:
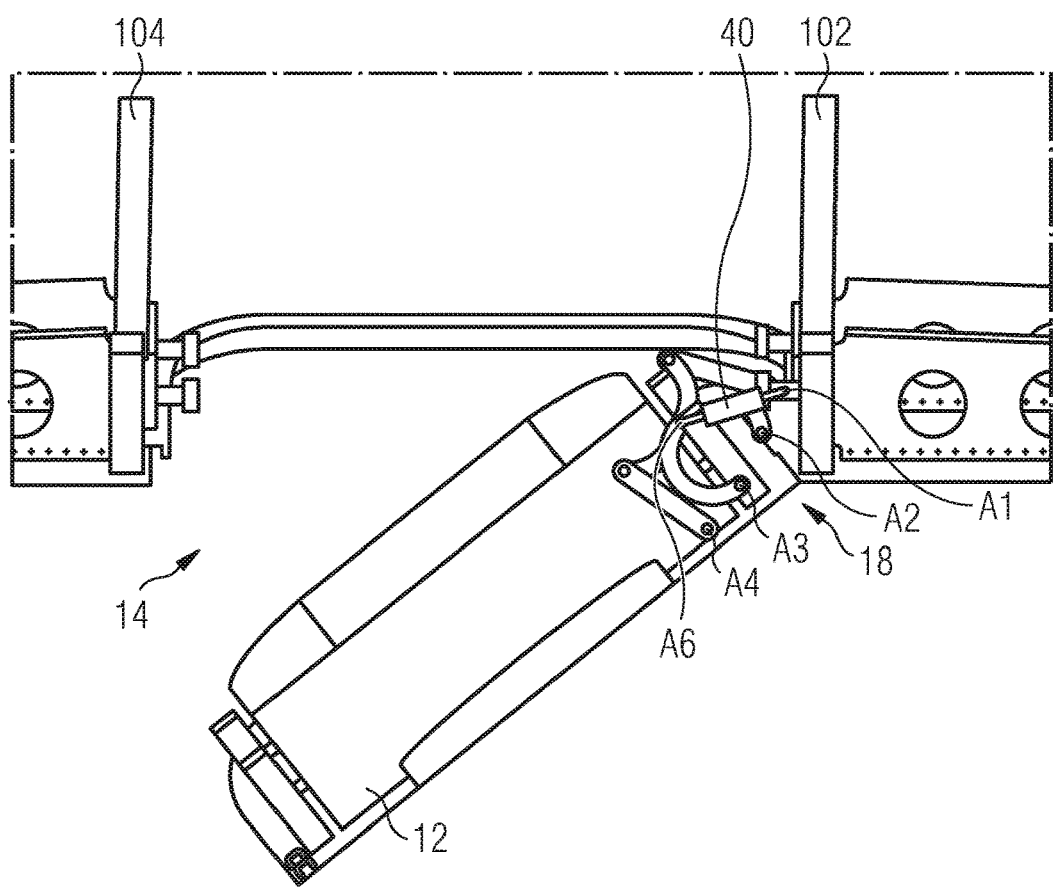
Figure 3E:
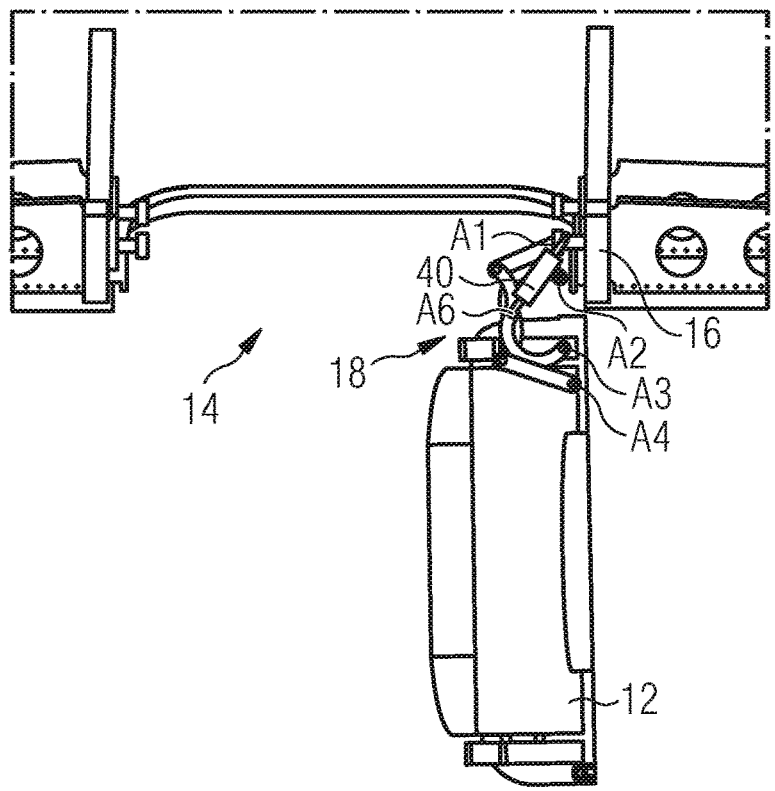

The intersection point X is preferably, in particular, in a projection plane which contains the intersection point X and runs perpendicularly to the axes A1 to A7, at the same distance away from the first axis A1 as from the fourth axis A4 when the door leaf 12 is in its closed position. In addition, in this state and along the projection plane, the intersection point X can be the same distance away from the second axis A2 as from the third axis A3 and/or can be the same distance away from the fifth axis A5 as from the seventh axis A7. Since the axes A1-A7 run substantially parallel to one another, the aforementioned distance relationships apply analogously to the sixth axis A6 instead of the intersection point X. Relative to a plane of symmetry E1 containing the sixth axis A6, the first axis A1 is arranged symmetrically with respect to the fourth axis A4 and the second axis A2 is arranged symmetrically with respect to the third axis A3 when the door leaf 12 is in its closed position (cf. FIG. 3A with respect to the second embodiment).

At a third position along the third articulated arm 23, the third articulated arm 23 is mounted on the first articulated arm 21 so as to be rotatable about a seventh axis A7 and, at a fourth position, at the point of the intersection point X, along the third articulated arm 23, is mounted on the second articulated arm 22 so as to be rotatable about the sixth axis A6. The third position is further away from the third axis A3 than the fourth position. For example, the third position can lie at an end of the first articulated arm 21 opposite the frame section 16 and/or at an end of the third articulated arm 23 opposite the door leaf 12. Furthermore, the first position can lie at an end of the second articulated arm 22 opposite the frame section 16 and/or at an end of the fourth articulated arm 24 opposite the door leaf 12.

The four articulated arms 21, 22, 23, 24 of the door arrangement 10 according to the first embodiment are also shown in FIGS. 3A-3G, 4 and 5 in the context of other embodiments. The first and the fourth articulated arm 21, 24 are straight, in particular in a plane perpendicular to the axes A1 to A7, for example, in the projection plane. They can be designed, for example, as (flat) struts. The first articulated arm 21 preferably extends substantially linearly from the point at which it is fastened to the frame section 16 as far as the third position. The fourth articulated arm 24 preferably extends substantially linearly from the point at which it is fastened to the door leaf 12 as far as the first position. The second and the third articulated arms 22, 23 are of curved design in particular in a plane perpendicular to the axes A1 to A7.

The second articulated arm 22 is curved away from the fourth articulated arm 24 starting from the first position in the direction of the second position, and the third articulated arm 23 is curved away from the first articulated arm 21 starting from the third position in the direction of the fourth position when the door leaf 12 is in its closed position. In other words, in a projection of the second and third articulated arms 22, 23 onto the projection plane, when the door is closed, the arms together follow a circle and a semicircle, wherein the circle intersects with the semicircle at the intersection point X. The circle furthermore intersects the second, third and sixth axes A2, A3, A6 and the semicircle intersects the fifth, sixth and seventh axes A5, A6, A7. Overall, the first articulated arm 21 is designed as per the fourth articulated arm 24 and the second articulated arm 22 is designed as per the third articulated arm 23.

As already mentioned, in FIGS. 1A-1C, the articulated arms 21 to 24 of the articulation arrangement 18 are illustrated with solid lines in the closed position of the door leaf 12 and with interrupted lines in the open position of the door leaf 12. If the door leaf 12 is opened from its closed position shown in FIG. 1A, the third articulated arm 23 carries along the first articulated arm 21 which is coupled thereto, wherein the first articulated arm 21 rotates about the first axis A1, and therefore the seventh axis A7 is shifted along a first circular path K1, the center point of which is the first axis A1. Analogously thereto, the fourth articulated arm 24 carries along the second articulated arm 22 which is coupled thereto, and therefore the fifth axis A5 is shifted along a second circular path K2, the center point of which is the second axis A2. Owing to the coupling between the second articulated arm 22 and the third articulated arm 23, the intersection point X cannot migrate along the second or third articulated arm 22, 23 when the door leaf 12 is moved. Since the articulated arms 21 and 22 are coupled as described to the frame section 16 and the articulated arms 23 and 24 are coupled as described to the door leaf 12 and the distance between the first axis A1 and the second axis A2 and the distance between the third axis A3 and the fourth axis A4 is constant, it follows, given a constant length of the articulated arms 21 to 24, that the door leaf 12 is guided along a predefined opening path by means of the articulation arrangement 18. In the two door positions shown in FIG. 1A, i.e., in the closed position of the door leaf 12 and in the open position, in which the door leaf 12 is opened in relation to its closed position by an opening angle W of approx. 45 degrees, the sixth axis A6 is located on a first side of a plane E2 containing the first and the second axis A1, A2.

If the door is opened further, the door leaf 12 guided by the articulation arrangement 18 rotates further in such a manner that, in its open position shown in FIG. 1B, in which the opening angle is approx. 135°, it substantially completely opens up the door opening 14. In this state, the sixth axis A6 lies in the plane E2. That is to say, up to this opening angle W, the distance between the sixth axis A6 or the intersection point X and the first axis A1 increases. At larger opening angles W, the distance between the sixth axis A6 or the intersection point X and the first axis A1 decreases as the opening angle W increases. If the door leaf 12 is opened, for example completely, in particular by an opening angle W of approx. 180° (see FIG. 1C), the sixth axis A6 is located on a second side of the plane E2 opposite the first side. As is apparent from FIGS. 1A to 1C, the size of the door leaf 12 is not directly limited by the size of the articulation arrangement 18 since the door leaf 12 pivots open outwards.

A door arrangement 10 shown in FIGS. 2A-2C and 3A-3G according to a second embodiment differs from the door arrangement 10 shown in FIGS. 1A-1C in that it additionally comprises a spring element 40. In the embodiment shown here, the spring element 40 connects the first articulated arm 21, preferably in the region of the first axis A1, to the second and third articulated arms 22, 23 at the second or fourth position (i.e., at the intersection point). Alternatively, it is conceivable for the spring element 40 to firstly act on the first articulated arm 21 between the first axis A1 and the seventh axis A7 and secondly on the second articulated arm 22 between the second axis A2 and the fifth axis A5. If the spring element 40 as described above and shown in the figures connects the first axis A1 to the intersection point X, the spring element is pretensioned when the door leaf 12 is pivoted from its closed position into the open position shown in FIG. 2A. The spring element 40 is therefore configured to pull the sixth axis A6 in the direction of the first axis A1. If the door leaf 12 is arranged tilted in relation to the vertical, i.e., the door is pivoted open obliquely downwards, the spring force of the spring element 40 counteracts the gravitational force acting on the door leaf, and therefore the door leaf 12 does not stand out by itself.

Figure 2A:
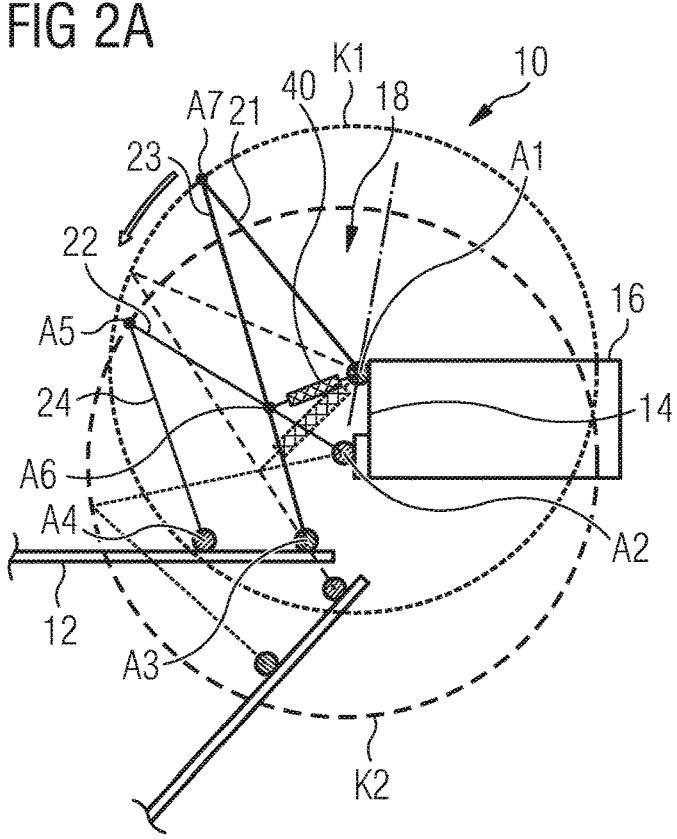
FIG. 2A shows a second embodiment of a door arrangement in a schematic view, wherein the door leaf is illustrated in its closed position and in a first open position at an opening angle of approx. 45°.
Figure 2B:
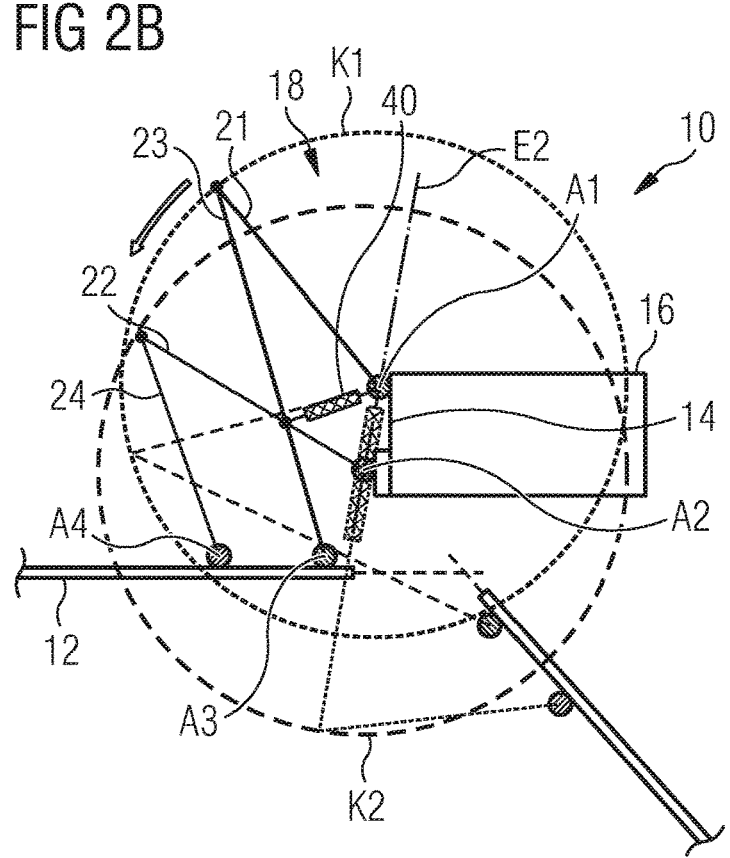
FIG. 2B shows the door arrangement from FIG. 2A in a schematic view, wherein the door leaf is illustrated in its closed position and in a second open position at an opening angle of approx. 135°.
Figure 2C:
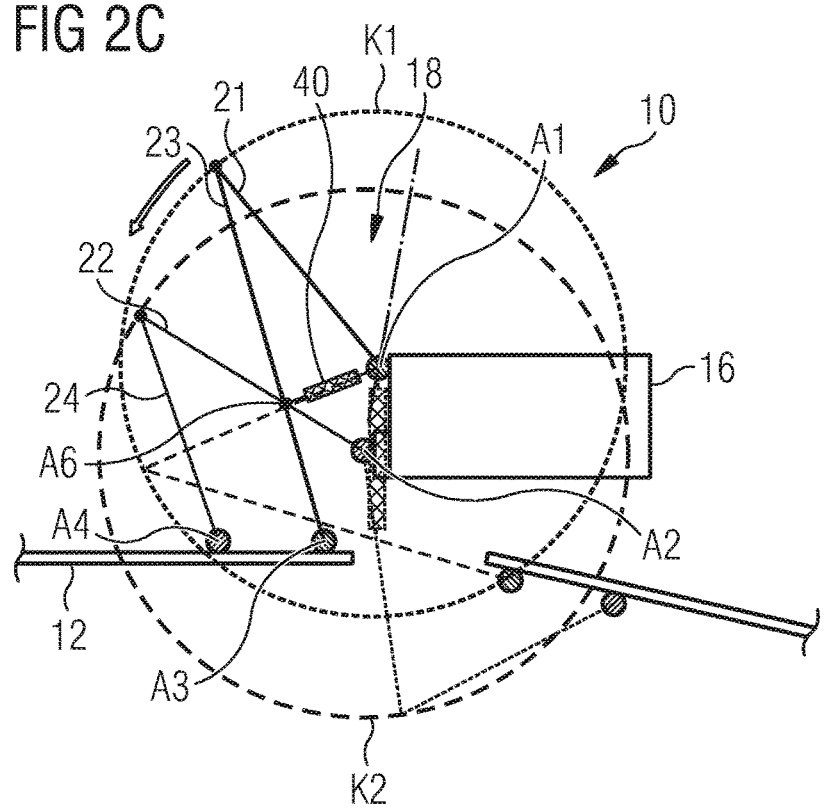
FIG. 2C shows the door arrangement from FIG. 2A in a schematic view, wherein the door leaf is illustrated in its closed position and in a third open position at an opening angle of approx. 180°.
Figure 3F:
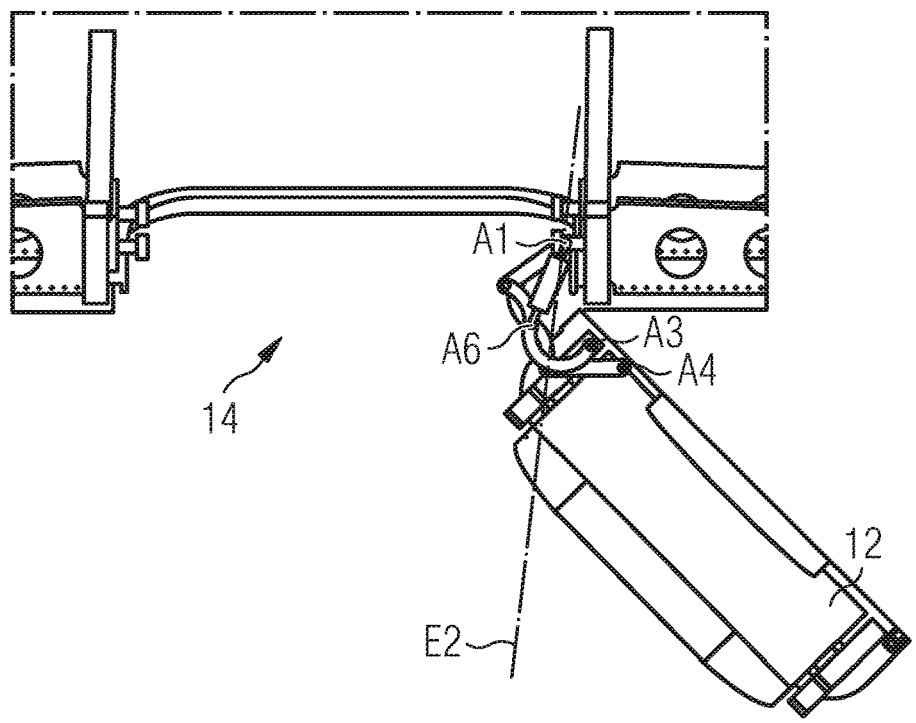
Figure 3G:
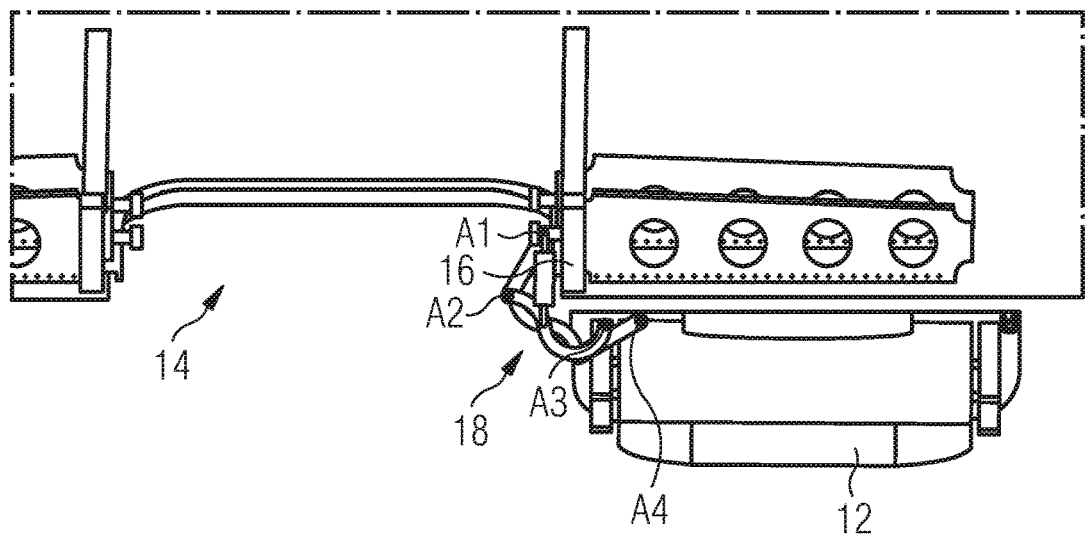

If the door leaf 12 is pivoted further outwards, the sixth axis A6 traverses the plane E2, for example, at an opening angle W of approximately 135 degrees (see FIGS. 2B and 3F). In this state, the spring element 40 is maximally pretensioned and the door leaf 12 is at its dead center, in which it is neither closed by the spring element 40 nor opened further. After the door leaf 12 has been pivoted beyond its dead center, in which the sixth axis A6 lies in the second plane E2, the sixth axis A6 is located on the second side of the second plane E2. In this case too, the spring element 40 pulls the sixth axis A6 in the direction of the first axis A1. Since the distance between the sixth axis A6 and the first axis A1 becomes smaller in this case as the opening angle W increases, the pretensioned spring element 40 exerts a force on the door leaf 12 in the opening direction of the door. If the door leaf 12 is arranged tilted in relation to the vertical, i.e., the door is pivoted obliquely downwards, the spring force of the spring element 40 in turn counteracts the gravitational force acting on the door leaf 12, and therefore the door leaf 12 does not leave its completely opened position by itself.

If the spring element 40 comprises a steel spring, the latter is stretched during the pretensioning. The spring element 40 can additionally comprise a damping member which exerts a damping force on the door leaf 12, the damping force being directed counter to the direction of movement of the door leaf 12. The spring element 40 can alternatively be configured as a spring-damper element, for example as a gas-filled compression spring.

Otherwise, the door arrangement 10 from FIGS. 2A-2C and 3A-3G has all of the features of the door arrangement 10 from FIGS. 1A-1C.

Figure 4:
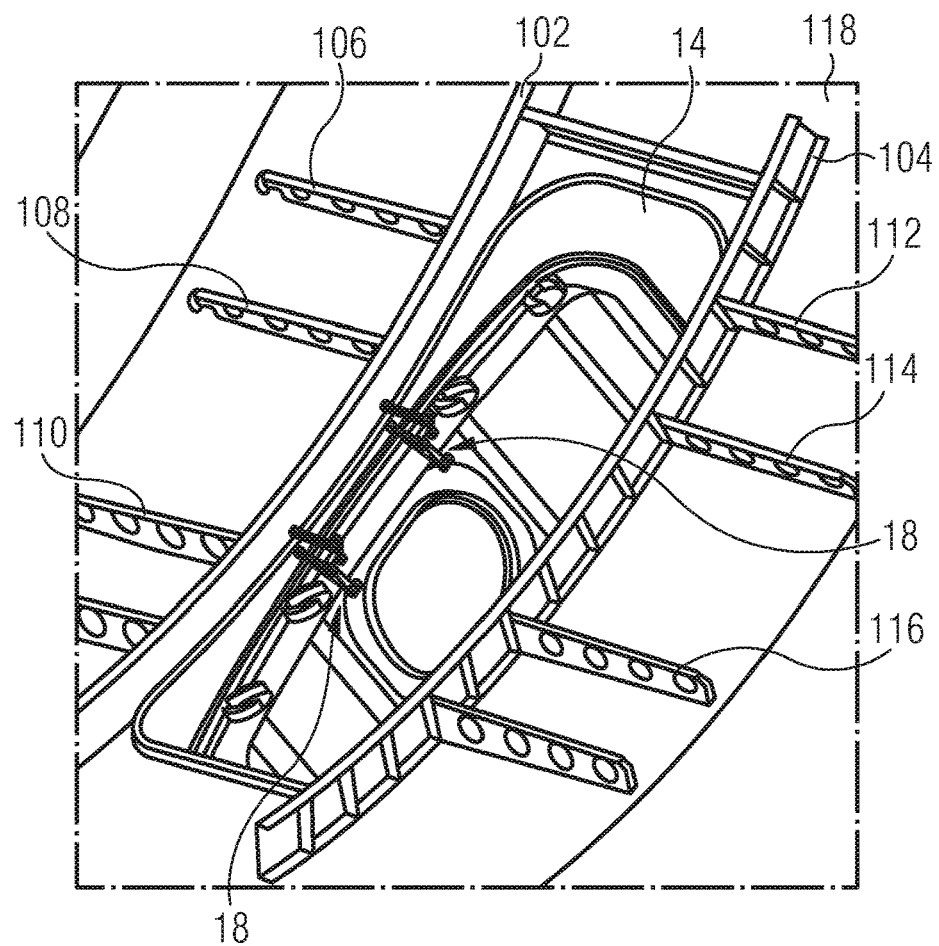
FIG. 4 shows an embodiment of an aircraft in a perspective partial view from the interior of the aircraft outward, wherein the door leaf is in its open position.
Figure 5:
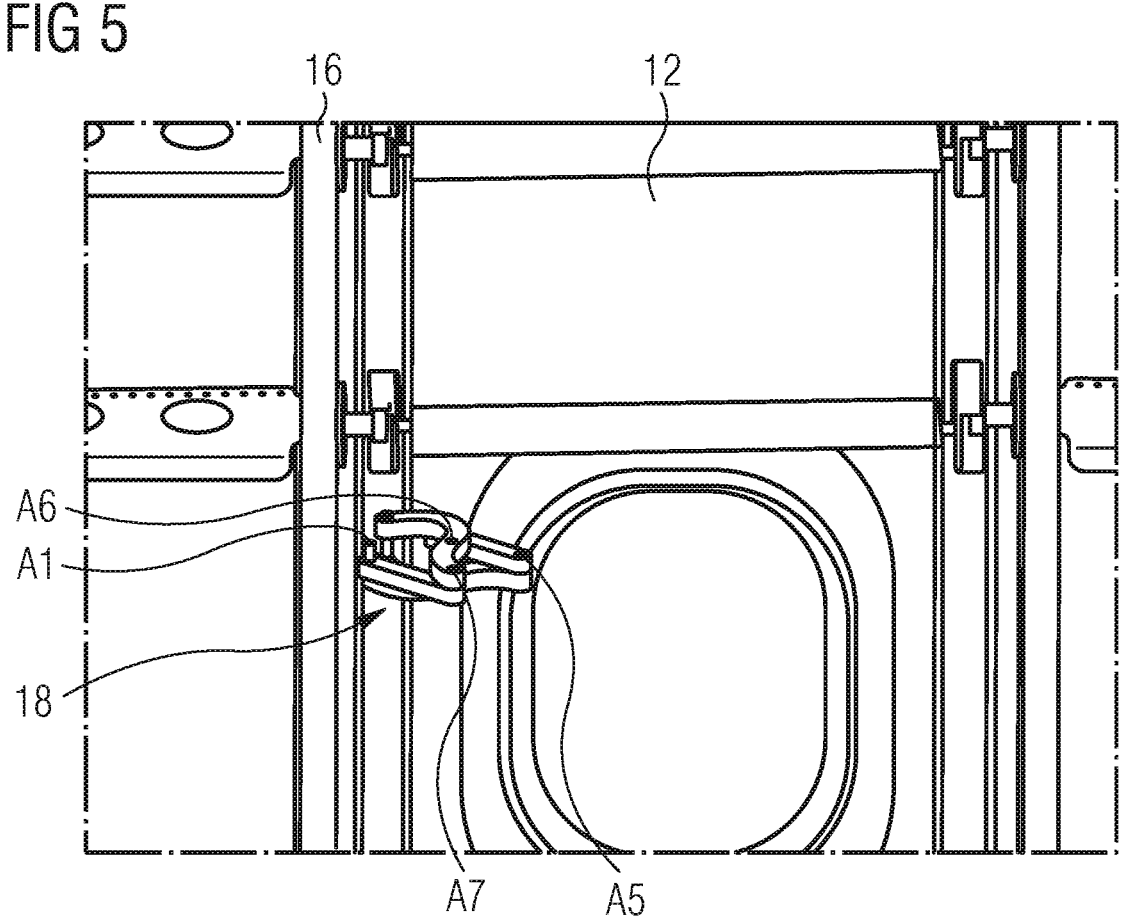
FIG. 5 shows a detailed view of the door arrangement of the aircraft from FIG. 4 in a side view from the interior of the aircraft, wherein the door leaf is in its closed position.
Figure 6:
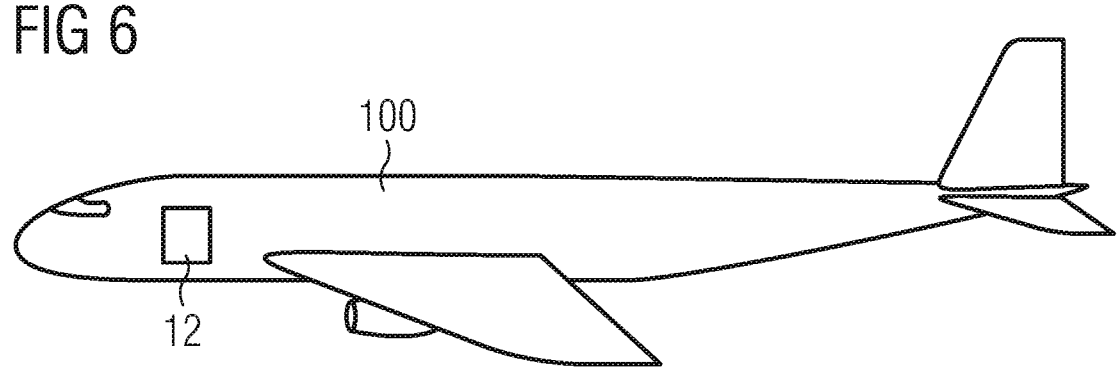
FIG. 6 shows the aircraft from FIG. 4 in a schematic side view.

An aircraft 100 shown in FIGS. 4 to 6 comprises the door arrangement 10 illustrated in FIGS. 2A-2C and 3A-3G. The aircraft 100 comprises a plurality of ribs 102, 104 and stringers 106-116. The door opening 14 is arranged between two mutually adjacent ribs 102, 104, from which stringers 106-116 running parallel to one another in each case extend on the side of the ribs opposite the door opening 14. Each two stringers arranged on opposite sides of the door opening 14 (for example the stringers 106 and 112) extend collinearly with respect to each other. All of the stringers 106-116 preferably run in the longitudinal direction of the aircraft 100. The ribs 102, 104 run in transversal planes of the aircraft 100, which transversal planes are oriented substantially perpendicularly to the longitudinal direction. The frame section 16 is formed integrally with an outer wall 118 arranged on the ribs 102, 104 and stringers 106-116. Alternatively, it is conceivable for the frame section 16 to be part of a rib 102, 104 and/or stringer 106-116. The door arrangement 10 from FIGS. 4 and 5 has two substantially identical articulation arrangements 18 which are arranged spaced apart from each other along the frame section 16 on the same side of the door leaf 12. The articulation arrangements 18 can each have any desired features of the articulation arrangement 18 described above.

As is apparent, in particular, from FIG. 5, the articulated arms 21 to 24 of all of the articulation arrangements described above can extend in three planes running perpendicularly to at least one of the first to seventh axes A1-A7. For example, the first and the fourth articulated arms 21, 24 can extend in a third plane running perpendicularly to the first and fourth axes A1, A4. The second articulated arm 22 can extend in a fourth plane which is arranged on a first side of the third plane and runs parallel to the third plane, and the third articulated arm 23 can extend in a fifth plane which is arranged parallel to the third plane on a side of the third plane opposite the fourth plane. In addition, in each case two interconnected articulated arms 21-24 can be connected to each other via bolts or pins arranged along the respective connecting axis A1-A7.

FIG. 6 shows that the door leaf 12 is the aircraft door to the passenger cabin. Alternatively, the door leaf 12 can be an aircraft door to the hold or any other aircraft door, in particular a door closing a door opening 14 in an outer wall 118 of the aircraft 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A door arrangement for an aircraft, comprising:
a door leaf, which is pivotable between a closed position, in which the door leaf closes a door opening of the aircraft, and an open position, in which the door leaf opens up the door opening,
a frame section arranged in a region of the door opening, and
an articulation arrangement which connects the door leaf to the frame section and has a plurality of articulated arms,
wherein a first of the articulated arms is mounted on the frame section so as to be rotatable about a first axis, a second of the articulated arms is mounted on the frame section so as to be rotatable about a second axis, a third of the articulated arms is mounted on the door leaf so as to be rotatable about a third axis and a fourth of the articulated arms is mounted on the door leaf so as to be rotatable about a fourth axis,
wherein, at a first position along the second articulated aim, the second articulated arm is coupled to the fourth articulated arm so as to be rotatable about a fifth axis and, at a second position along the second articulated arm, is coupled to the third articulated arm so as to be rotatable about a sixth axis, wherein the first position is further away from the second axis than the second position,
wherein, at a third position along the third articulated aim, the third articulated arm is coupled to the first articulated arm so as to be rotatable about a seventh axis and, at a fourth position along the third articulated arm, is coupled to the second articulated arm so as to be rotatable about the sixth axis, wherein the third position is further away from the third axis than the fourth position,
wherein the first to seventh axes are oriented substantially parallel to one another, and
wherein at least one of the first articulated arm is configured identical to the fourth articulated arm, or the second articulated arm is configured identical to the third articulated arm.

2. The door arrangement according to claim 1, wherein at least one of the first or the second axis is arranged in a positionally fixed manner relative to the frame section.

3. The door arrangement according to claim 1, wherein at least one of the third or the fourth axis is arranged in a positionally fixed manner relative to the door leaf.

4. The door arrangement according to claim 1, wherein, with respect to a plane of symmetry containing the sixth axis, the first axis is arranged symmetrically with respect to the fourth axis and the second axis is arranged symmetrically with respect to the third axis when the door leaf is in the closed position.

5. The door arrangement according to claim 1, wherein at least one of the first or the fourth articulated arms is straight.

6. The door arrangement according to claim 1, wherein at least one of the second or the third articulated arms is curved.

7. The door arrangement according to claim 1, wherein at least one of
the second articulated arm is curved away from the fourth articulated arm starting from the first position in the direction of the second position, or the third articulated arm is curved away from the first articulated arm starting from the third position in the direction of the fourth position when the door leaf is in the closed position.

8. The door arrangement according to claim 1, wherein the door leaf is pivotable by at least 80 degrees about an axis of rotation which is preferably positionally fixed relative to the frame section.

9. The door arrangement according to claim 1,
wherein the sixth axis is arranged on a first side of a plane containing the first and the second axis when the door leaf is in the closed position, and
wherein the sixth axis is arranged on a second side of the plane opposite the first side when the door leaf is in the open position.

10. The door arrangement according to claim 1, further comprising a spring element arranged in a pretensioned manner when the sixth axis moves in a direction of a plane containing the first and the second axis.

11. An aircraft with a door arrangement according to claim 1.

* * * * *